June 25, 1940.  W. L. PROEGER  2,205,668
MOLD
Filed Feb. 5, 1938
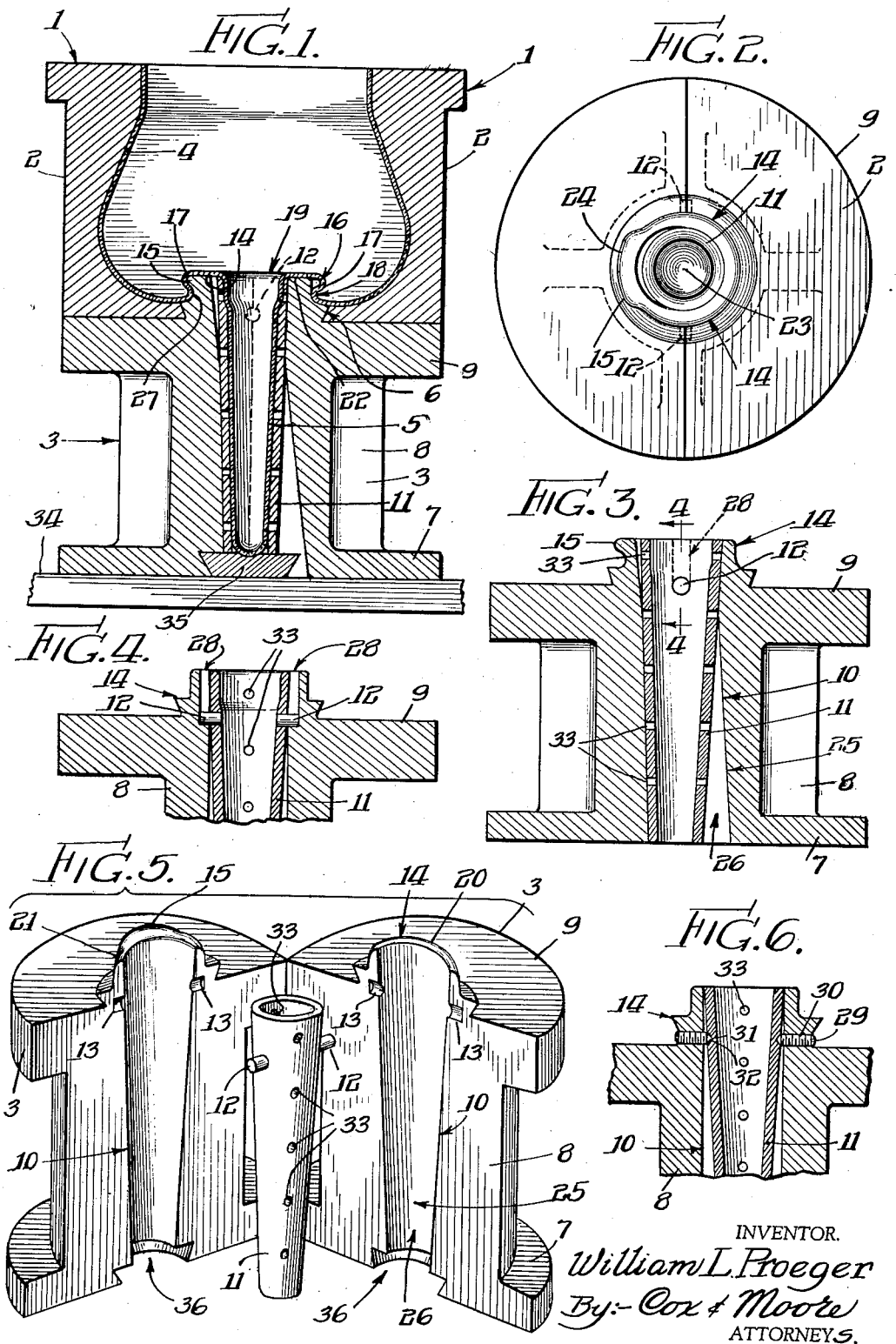
INVENTOR.
William L. Proeger
By:- Cox & Moore
ATTORNEYS.

Patented June 25, 1940

2,205,668

UNITED STATES PATENT OFFICE 2,205,668

MOLD

William L. Proeger, Chicago, Ill., assignor to Chamberlain, Inc., Chicago, Ill., a corporation of Illinois Application February 5, 1938, Serial No. 188,854

15 Claims. (Cl. 49—69)

This invention relates to molds in general and particularly to molds for molding plastic material. More specifically the invention relates to molds for molding blown coffee percolator bowls having an integrally connecting stem.

An important object of the invention is the provision of an improved, simplified and inexpensive mold whereby a blown glass percolator bowl and connecting stem may be blown as a unitary unit, there being a re-entrant portion provided in the form of an annular groove in the base of the bowl and on the outside thereof to provide an interior, overhanging, annular shoulder for the reception of a filter cloth or element whereby the cloth may be readily and instantly fastened in position by means of a clip or other supporting or fastening element.

Another object of the invention is to provide an interior, overhanging, annular shoulder whereby the finished bowl and its connecting stem may be readily removed from the mold without the necessity of a plurality of intricate, expensive, movable parts for releasing or freeing the bowl from the mold.

A further object of the invention is to provide a mold for blown glassware, the mold being provided with a rigid eccentric or cam-shaped element about which the bowl is rotated so as to provide an interior, annular, overhanging shoulder, provision being made to permit easy and instant removal of the bowl from the mold.

A still further object of the invention is the provision of a mold embodying a bowl portion and a stem portion operatively connected or arranged so as to provide the unitary integral structure of a bowl and its connecting stem, the mold being provided with an eccentric or cam-shaped element which may be made in two pieces, if the mold is split longitudinally, and which has its stem mold mounted for movement on a horizontal axis so that the bowl will be freed easily from the mold when the bowl is tilted at a slight angle, the stem mold being pivotally hung in position within the body of the mold to permit tilting motion or movement of the bowl and, of course, its connecting stem.

Numerous other objects and advantages will be apparent throughout the progress of the following specification.

The accompanying drawing illustrates selected embodiments of the invention and the views therein are as follows:

Fig. 1 is a detail vertical sectional view through the improved mold and embodying the invention.

Fig. 2 is a detail plan view of the lower mold.

Fig. 3 is a longitudinal sectional view through the stem mold.

Fig. 4 is a similar view on the line 4—4 of Fig. 3, being at right angles to Fig. 3.

Fig. 5 is a detail perspective view of the parts constituting the stem mold.

Fig. 6 is a detail sectional view similar to Fig. 4, showing a different way of swingingly mounting the stem mold in position in the lower side molds.

The particular mold herein shown for the purpose of illustrating the invention, comprises a mold 1 made in two sections, an upper section 2 and a lower section 3. The upper section 2 is made in two parts and may be pivotally connected together. The lower section 3 is also made in two parts, also preferably hinged together. The mold section 2 is adapted to rest upon and be supported upon the lower mold section 3.

The mold 1 comprising the two-part upper section 2 and the two-part lower section 3 is adapted for molding a blown glass percolator bowl 4 having a depending stem 5. The upper mold section 2, preferably comprising two parts pivoted together, may be of any conventional form depending upon the size and shape of the bowl portion 4. The upper mold section 2 is adapted to have interfitting or dovetailing relation or connection with the lower mold 3, as indicated at 6 (Fig. 1).

The lower mold 3 comprising two sections, as indicated in Fig. 5, is preferably hingedly connected together, as shown in that figure, and has a base portion 7 from which there extends upwardly a pedestal portion 8. An upper flanged portion 9 is integrally connected with the pedestal 8 and may constitute a base for the upper split mold 2.

A tubular opening or recess 10 extends longitudinally through the mold 3 and provides a receiving chamber for the stem mold section 11. The stem mold section is hollow so as to receive the stem 5 of the percolator bowl and it is provided with outwardly extending ears or trunnions 12 which may be received in the grooves 13. These grooves 13 are semi-cylindrical in each section of the mold 3 so that when the mold is swung together to position, the ears or trunnions 12 will be swingingly supported in the grooves 13, the grooves 13 when the mold is closed providing cylindrical recesses.

The upper part of the mold 3 surrounding the longitudinal opening 10 and extending upwardly from the top of the portion 9 is provided with an eccentrically shaped or cam-shaped member 14. This member 14 is generally circular, as indicated in Fig. 2, and has an overhanging lip 15. Thus, when the glass is being blown in the mold to form the stem and bowl, an exterior annular groove or re-entrant 16 will be provided in the underside of the bowl portion 4, thereby providing an overhanging annular shoulder 17. The shoulder 17 provides the interior annular groove 18 for the reception of fastening means for fastening a strainer element over the top of the stem opening 19 (Fig. 1).

As the mold 2 is preferably made in two parts, as shown in Fig. 5, the eccentric or cam 14 will have a relatively circular portion 20 (Fig. 5) on one-half of the mold, and a second substantially cylindrical portion 21 on the other half of the mold, the half portion 21 of the mold carrying the lip 15. Therefore, when the glass is being molded, the bottom edge 22 of the bowl will be supported by the member 14 except that portion lying outwardly of the lip 15. As the globe is rotated during the blowing of the bowl the diameter of the annular groove 16 will be twice the radius from the center 23 to the exterior edge 24 of the lip 15 (Fig. 2).

It is preferable and extremely advantageous that one part of the vertical opening 10 be deepened or cut away, as shown at 25 in Fig. 3, to provide an elongated cut back slot 26 to permit swinging movement of the member 11 in the opening portion 10. The cut back portion 26 is diametrically opposite the overhanging lip or shoulder 15 so that the swinging movement of the lower part of the stem mold 11 will be to the right (Fig. 3) and the upper part of the stem mold 11, that is, upwardly of the pin or ear 12 (Fig. 3), will be to the left. This construction permits the entire bowl 4, including the bowl portion and stem portion 5, to be tilted toward the left (Figs. 1 and 4) so as to permit the bowl to be freed easily from the lip 15.

The weight of the stem mold 11 is relatively heavy so that the mold 11 in its normal hanging position will be vertical and concentric but, when the upper part of the bowl 4 is tilted, it can easily be removed from the mold because the tilting motion is sufficient to clear the edge 27 of the bowl from the lip 15, and as soon as the bowl is withdrawn the stem mold 11 will hang straight again, righting itself in the mold opening 10 because of the weight of the member 11.

It is not necessary that the mold 3 be made in two parts as it can very readily be made in one solid piece. The opening 10 can be bored longitudinally through a solid piece of metal, and the eccentric or cam member 14 can be made in a solid piece fixed to the top portion 9, or it may be formed integrally therewith. The stem mold portion 11 may be fitted into the opening 10 by providing elongated grooves 28 (Fig. 4). Thereby the mold portion 11 is swingingly positioned inside of the mold 3 and the mold 11 may be withdrawn vertically from the mold 3, the vertical slots or grooves 28 permitting the ears or trunnions 12 to freely pass out of the mold body.

Also, if the mold 3 is made in a solid piece, the stem mold portion 11 can be maintained in proper and swinging position by the provision of radial screws 29 (Fig. 6). These screws or studs 29 pass through radially positioned threaded openings 30. The ends of the studs or screws 29 are preferably pointed, as indicated at 31 (Fig. 6), and nest into conical-shaped openings 32 provided in the outer side walls of the stem mold section 11.

It is preferable, of course, that the screws or studs 29 be arranged diametrically opposite each other so as to freely support and balance the stem mold 11. Of course, it would not be absolutely necessary to provide the cut-away slot portion 26 so as to permit swinging movement of the stem mold 11 because the glass bowl and its connecting stem, before it is removed from the mold, is in a sufficiently plastic state so as to permit the tilting of the bowl by the bending of the stem. The stem, however, could be bent back straight again as soon as it is removed from the mold as the glass has not become sufficiently cool, and, therefore, is flexible at the stage when it is removed. However, it is considerably more advantageous to provide the swinging movement of the stem mold 11 so that no part of the bowl 4 will become bent during removal. Furthermore, the glass may be permitted to remain in the mold until it is completely cooled and still the bowl 4 may be readily and easily removed from the mold.

It is desirable and advantageous, however, to make the mold 3 in two sections, as shown in Fig. 5, as it can be set, placed and repaired more readily. It is of extreme importance, however, that the stem mold portion 11 be made removable in any suitable manner, such as shown in Figs. 4, 5 and 6, so that the stem mold 11 may be instantly removed to permit the stem mold to be lined with paste. The complete mold, including the upper mold 2 and the lower mold 3, is provided with vent openings (not shown) to permit the escape of steam or vapor during the forming of the bowl. The stem mold 11 is provided with vent openings 33 to permit the escape of steam or vapor. The openings 33 may be diametrically opposite, as shown in the various figures.

The entire mold 1 may be carried by and mounted upon a base plate 34 which has an upwardly extending portion 35 to be received in a slot 36 formed in the base 7 whereby the mold may be properly centered.

The invention provides a solid, sturdy mold which provides a bowl to be blown smooth and clean without any checks, scratches, imperfections or rough surfaces. The mold can be readily and economically manufactured. The bowl can be instantly, quickly and easily removed; and undesirable, expensive, movable parts have been eliminated.

Changes may be made in the form, construction and arrangement of the parts without departing from the spirit of the invention or sacrificing any of its advantages and the right is hereby reserved to make all such changes as fairly fall within the scope of the following claims.

The invention is hereby claimed as follows:

1. A mold for percolator bowls having connecting stems comprising a body having an opening therein, and a stem mold supported in said opening and pivoted to said body.

2. A mold for percolator bowls having connecting stems comprising a body having an opening therein, a stem mold supported in said opening and pivoted to said body, and a rigid cam-shaped mold member on the body and arranged about the opening at the upper end of the stem mold.

3. A mold for molding glass coffee percolator bowls and the like having connecting stems comprising a mold member having an opening therein, a stem mold pivotally supported in the opening, and a rigid eccentrically shaped collar carried by the mold member at the upper end of the stem mold.

4. A mold for molding glass coffee percolator bowls and the like having connecting stems comprising a mold member having an opening therein, a stem mold in the opening, a rigid eccentrically shaped collar carried by the mold member at the upper end of the stem mold, and means for swingingly mounting the stem mold to the mold member in the opening.

5. A mold for molding glass coffee percolator bowls and the like having connecting stems comprising a mold member having an opening therein, a stem mold in the opening, a rigid eccentrically shaped collar carried by the mold member at the upper end of the stem mold, means for swingingly mounting the stem mold in the opening, and upper side molds above the mold member and extending upwardly from the stem mold.

6. A mold for molding glass coffee percolator bowls and the like having connecting stems comprising a mold member having an opening therein, a stem mold in the opening, said opening on one side thereof conforming generally to the shape of the stem mold and generally concentric therewith, the other side of the opening being elongated transversely to allow the stem mold to be tilted, and pivot means for permitting such tilting movement.

7. A mold for molding blown glass bowls and the like having integral connecting stems comprising a pair of side mold members having longitudinal grooves formed therein to provide an opening for receiving a stem mold, a stem mold arranged in said opening, the groove in one side member conforming generally to the shape of the stem mold, the groove in the other side member being deepened at its bottom to permit the stem mold to be swung or tilted in a direction away from the conforming groove, and means for swingingly mounting the stem mold in said opening, said grooves cooperating to permit such swinging or tiltable movement of the stem mold.

8. A mold for molding blown glass bowls and the like having integral connecting stems comprising a pair of side mold members having longitudinal grooves formed therein to provide an opening for receiving a stem mold, a stem mold arranged in said opening, the groove in one side member conforming generally to the shape of the stem mold, the groove in the other side member being deepened at its bottom to permit the stem mold to be swung or tilted in a direction away from the conforming groove, means for swingingly mounting the stem mold in said opening, said grooves cooperating to permit such swinging or tiltable movement of the stem mold, and relatively semi-circular collars atached to each side member at the upper end of the stem mold.

9. A mold for molding blown glass bowls and the like having integral connecting stems comprising a pair of side mold members having longitudinal grooves formed therein to provide an opening for receiving a stem mold, a stem mold arranged in said opening, the groove in one side member conforming generally to the shape of the stem mold, the groove in the other side member being deepened at its bottom to permit the stem mold to be swung or tilted in a direction away from the conforming groove, means for swingingly mounting the stem mold in said opening, said grooves cooperating to permit such swinging or tiltable movement of the stem mold, and relatively semi-circular collars attached to each side member at the upper end of the stem mold, the collar on the mold member having the conforming groove being provided with a radially extending projecting lip.

10. A mold for molding blown glass bowls and the like having integral connecting stems comprising a pair of side mold members hingedly connected together, said mold members each having a longitudinal groove formed therein to provide an opening for receiving a stem mold, and a stem mold received in said grooves, the groove in one side member conforming generally to the shape of the stem mold but being enlarged slightly at its upper end, the groove in the other side member being also conforming generally to the shape of the stem mold but enlarged transversely, the enlargement increasing downwardly so as to permit the stem mold to be swung or tilted in a direction away from the conforming groove, there being a pivot supporting said stem mold to the side molds near the upper end of the stem mold whereby the stem mold may be tilted about said pivot.

11. A mold for molding blown glass bowls and the like having integral connecting stems comprising a pair of side mold members hingedly connected together, said mold members each having a longitudinal groove formed therein to provide an opening for receiving a stem mold, a stem mold received in said opening, the groove in one side member conforming generally to the shape of the stem mold but being enlarged slightly at its upper end, the groove in the other side member being also conforming generally to the shape of the stem mold but enlarged transversely, the enlargement increasing downwardly so as to permit the stem mold to be swung or tilted in a direction away from the conforming groove, there being a pivot supporting said stem mold to the side molds near the upper end of the stem mold whereby the stem mold may be tilted about said pivot, a two-part annular collar carried by the mold, and an overhanging lip on one part of said collar on the side opposite the transversely enlarged groove.

12. A mold for molding blown glass bowls and the like having integral connecting stems comprising a pair of side mold members hingedly connected together, said mold members each having a longitudinal groove formed therein to provide an opening for receiving a stem mold, a stem mold received in said opening, the groove in one side member conforming generally to the shape of the stem mold but being enlarged slightly at its upper end, the groove in the other side member being also conforming generally to the shape of the stem mold but enlarged transversely, the enlargement increasing downwardly so as to permit the stem mold to be swung or tilted in a direction away from the conforming groove, there being a pivot supporting said stem mold to the side molds near the upper end of the stem mold whereby the stem mold may be tilted about said pivot, a two-part annular collar carried by the mold, and an overhanging lip on one part of said collar on the side opposite the transversely enlarged groove.

13. A mold for molding glass blown articles having a bowl portion and a connecting stem with an interior shoulder in the bowl to provide an annular recess to receive filter fastening means and comprising a pair of side mold members having an opening therein, and a stem mold removably and pivotally supported in said opening and carried by the side mold members.

14. A mold for molding glass blown articles having a bowl portion and a connecting stem with an interior shoulder in the bowl to provide an annular recess to receive filter fastening means and comprising a pair of side mold members having an opening therein, a stem mold removably and tiltably supported in said opening and carried by the side mold members, and a rigid cam-shaped mold part rigidly carried by said side mold members at the upper end of the stem mold.

15. A mold for percolator bowls and the like comprising a body mold having a bowl forming cavity therein, a depending stem mold having a stem forming opening therein, a support, said stem mold being pivotally supported on the support and projecting into said bowl forming cavity with the stem forming opening of the stem mold in communication with the bowl forming cavity, said support having an annular portion projecting into the bowl forming cavity about the portion of the stem mold projecting into said cavity and an eccentric shoulder of limited angular extent, projecting from the annular portion and overhanging the bottom of the bowl forming cavity whereby to form an annular lip overhanging the bottom of the bowl upon rotation of the bowl in the body mold and to release the bowl from the molds upon tilting the bowl and the stem mold relative to the body mold.

WILLIAM L. PROEGER.